UNITED STATES PATENT OFFICE.

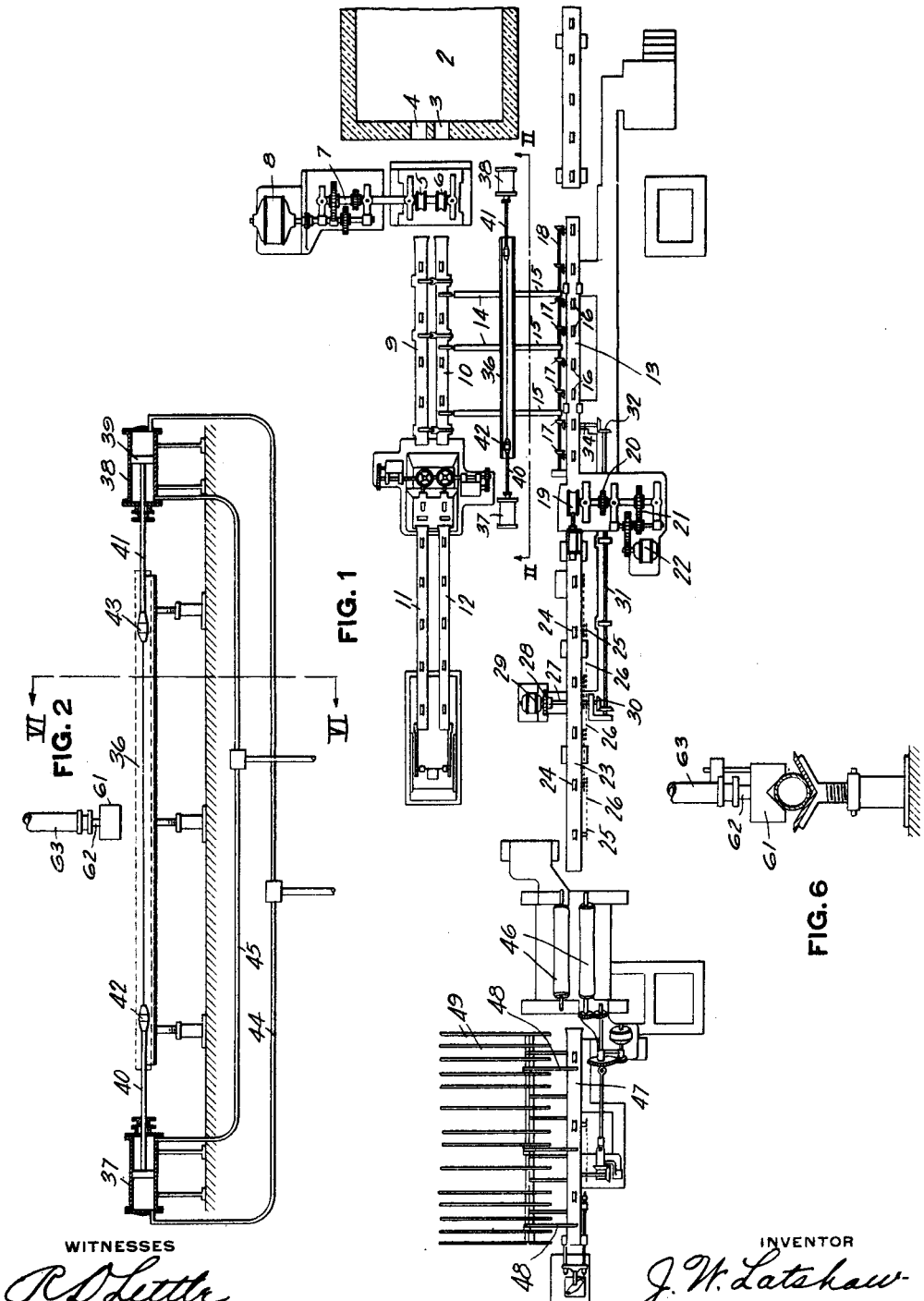

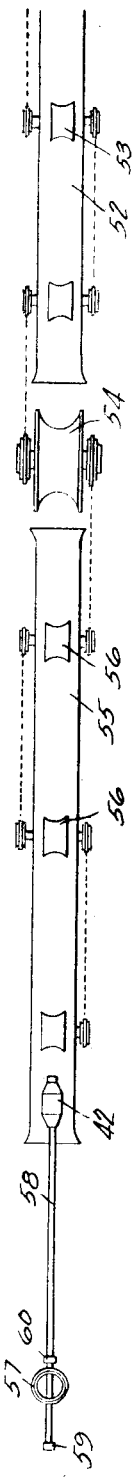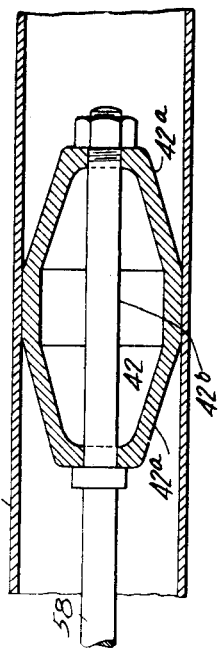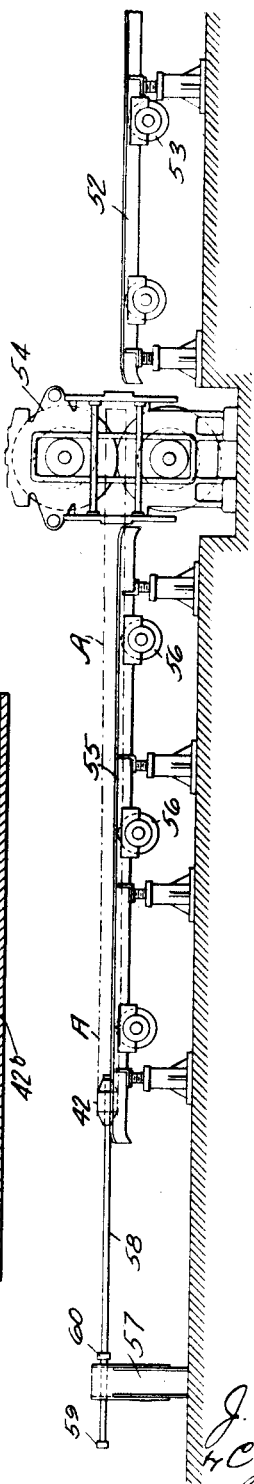

JOSEPH W. LATSHAW, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

METHOD OF AND APPARATUS FOR FINISHING PIPES AND TUBES.

1,143,912.  Specification of Letters Patent.  Patented June 22, 1915.

Application filed December 26, 1914. Serial No. 879,116.

*To all whom it may concern:*

Be it known that I, JOSEPH W. LATSHAW, a citizen of the United States, and resident of Pittsburgh, in the county of Allegheny and State of Pennsylvania, have invented certain new and useful Improvements in Methods of and Apparatus for Finishing Pipes and Tubes, of which the following is a specification.

My invention relates to the manufacture of wrought metal pipes and tubes and while not restricted to such use, more particularly relates to the manufacture of the larger sizes of such pipes or tubes made by the lap-weld process.

In manufacturing welded pipes and tubes the skelp are scarfed and when heated are passed between the welding rolls and a welding ball, the welding ball being held in position between the welding rolls by means of a suitable mandrel. The mandrels are then removed from the welded pipes and the welded pipes, while still heated from the welding operation are passed between sizing rolls which fixes the external diameter of the pipe. Ordinarily the pipes are then straightened by cross rolling after which they are cooled, cut to length, threaded on each end and tested.

In manufacturing lapweld pipes and tubes, the front or first welded end of the pipes is invariably found to be slightly smaller in diameter than the body portion of the pipes or tubes and the last welded or rear end of the pipes. The reason is that the front end has flat places and is not truly cylindrical when welded, this condition being caused by the front end of the pipe skelp flattening in striking the welding rolls, and having the effect of slightly lessening the circumference of the end of the pipes so that later when the welded pipes are sized or rounded the front end is slightly smaller in diameter, and in some cases, is not truly cylindrical. The result is that after the pipes are severed to length and the taper threads are cut on the pipe ends, the front or first welded ends will have black threads (*i. e.* threads which are not sharp but which are slightly flattened at their apices). When a sufficient length is cut off the end of the pipes to insure the avoidance of black threads, the scrap loss is materially increased and when threaded and then found to have defective threads, requiring a further cropping operation and second thread cutting operation, the cost of manufacture is still further increased.

One object of my invention is to provide a novel method of finishing pipes and tubes whereby the opposite ends of the pipes or tubes are formed to the same diameter, the diameter of the ends of the pipes is made to the standard size and the formation of perfect threads on each end of the pipes is thereby made possible, and loss heretofore occasioned by the formation of imperfect threads on the pipe ends is prevented and overcome.

Another object of the invention is to provide an improved method of finishing the pipes or tubes by which the first welded or smallest end of the pipes is expanded to the standard diameter, and the ends of the pipes are made of equal diameter without material increase in the cost of manufacturing the pipes.

A further object of my invention is to provide apparatus of improved construction having novel means, enabling my improved method to be carried out in making the pipes and tubes, and standardizing the diameter of the ends thereof, without increase in cost of manufacture.

Still further objects of the invention will become apparent as it is more fully described hereinafter and is specifically pointed out in the appended claims.

Referring to the accompanying drawings, forming part of this specification, Figure 1 is a plan showing apparatus constructed and arranged in accordance with my invention, and adapted for use in carrying out the method forming part of this invention, (the stop 61 and operating mechanism being omitted from this figure for the sake of clearness.) Fig. 2 is a detail sectional side elevation, on a larger scale, showing part of the apparatus of Fig. 1, the section being taken on the line II—II of Fig. 1. Fig. 3 is a plan showing a modified form of apparatus embodying my invention. Fig. 4 is a side elevation of the same. Fig. 5 is a detail sectional plan, on a larger scale showing the construction of the expanding ball by which the pipe ends are expanded, in accordance with my invention. Fig. 6 is a detail sectional end elevation, on the line VI—VI of Fig. 2, showing one form of apparatus for holding the pipes stationary in expanding the ends thereof.

The apparatus of Figs. 1, 2, and 6 is adapted for use in expanding both ends of the pipes, while the apparatus of Figs. 3 and 4 is applicable for use in expanding but one end of the pipes, the pipe expanding ball of Fig. 5 being employed with the apparatus of Figs. 1 and 2 and also that of Figs. 3 and 4.

In the accompanying drawings, referring to Figs. 1, 2, and 6, the numeral 2 designates a welding furnace having openings 3 and 4 through which the pipe skelp are pushed from the furnace into the bite of one or the other of the pairs of welding rolls 5 and 6. The welding rolls are positioned in front of the openings 3 and 4 of the furnace and are connected by the reducing gearing 7 to a driving motor 8 in the usual known manner.

Positioned in front of the two passes in the welding rolls are conveyer troughs 9 and 10 which receive the welded pipes as delivered through the rolls in the welding operation, and located in front of the troughs 9 and 10 are troughs 11 and 12, these troughs forming part of the mandrel removing mechanisms by which the mandrels are withdrawn from the pipes at the completion of the welding operations, the pipes then being supported on one or the other of the troughs 9 and 10.

Extending lengthwise parallel with the troughs 9 and 10 is a trough 13 and connecting the troughs 9 and 10 with the trough 13 are skids 14 and 15 on which the pipes are rolled in being transferred from the troughs 9 and 10 to the trough 13. The trough 13 is provided with a series of power driven rollers 16, these rollers being connected by pairs of bevel gears 17 to a line shaft 18. Obviously however these rollers 16 may be driven by means of a sprocket chain, in a manner similar to that shown for driving the rollers 24 when considered necessary or advisable.

Located at one end of the trough 13 is a set of sizing rolls 19, having driving pinions 20, connected by the reducing gearing 21 to a driving motor 22.

On the discharge side of the sizing rolls 19 is a pipe receiving trough 23 having a series of power driven rollers 24. The rollers 24 may be operatively connected by sprocket wheels 25 and sprocket chains 26 to a driving shaft 27, which is operatively connected by reducing gearing 28 to the roller driving motor 29 in the manner shown, or a line shaft and series of bevel gears may be employed in driving the rollers, in the same manner as shown for driving the rollers 16. The driving shaft 27 is also operatively connected by bevel gears 30 and 32 to a cross shaft 34 by which the line shaft 18 for the rollers 16 of the trough 13 is driven.

Positioned between the adjacent ends of the skids 14 and skids 15 is a trough 36 which extends parallel with the troughs 10 and 13, and located at the ends of the trough 36 are fluid pressure cylinders 37 and 38 having pistons 39 and piston rods 40, 41.

The gripper or stop 61 above the trough 36 depends from the reciprocating piston rod 62 operatively mounted in the suspended fluid pressure cylinder 63 so as to move into and out of holding engagement with pipes supported in the trough 36 and prevent lengthwise movement of the pipes while the expanding balls 42 and 43 are forced into the ends of the pipes.

The projecting ends of the piston rods 40 and 41 are provided with pipe expanding balls 42 and 43 of similar construction and the fluid pressure cylinders 37 and 38 each have ports connected by suitable piping to a source of fluid pressure. As shown the stuffing box ends of the cylinders 37 and 38 are connected by the piping 45 at one of the ports of a four way valve and the other ends of these cylinders are connected by piping 44 to another of the ports of the four way valve so that the one valve is all that is required to admit fluid pressure to the cylinders and to control the exhaust therefrom and in this way cause the pistons 39 and pipe expanding balls 42 and 43 to be simultaneously advanced or retracted in expanding the ends of the pipe.

In the apparatus of Figs. 1, 2, and 6, both ends of the pipes are expanded, but when desired but one end only may be expanded.

On the discharge end of the trough 23 at the back of the sizing rolls 19 are straightening rolls 46, by which the sized pipes are straightened, which deliver the pipes lengthwise to the trough 47 and the pipes are rolled on the skids 48 from the trough 47 to the cooling bed 49.

In the modified construction shown in Figs. 3 and 4, the numeral 52 designates a trough having driven feed rollers 53 on which the pipes are received from the pipe welding rolls (not shown) and are delivered to the sizing rolls 54 and 55 is a trough having driven feed rollers 56 on which the pipes are received from the sizing rolls and are caused to travel backwardly and pass a second time through the sizing rolls 54. This particular construction, in the use of which the pipes are passed a second time through the sizing rolls is preferably although not always employed, as passing the pipes two or more times through the sizing rolls makes the pipes more nearly of uniform diameter and standard size.

Positioned in line with the trough 55 is a vertical post 57 which is rigidly secured to a suitable foundation and secured in a slot or transverse opening in the upper end of the post is a horizontally extending ball supporting bar or mandrel 58. The bar is provided with separated collars 59 and 60 at the rear end of the bar which engage the opposite sides of the post 57 and limit the lengthwise movement of the bar 58 which is arranged to be reciprocated lengthwise.

Rigidly secured on the other end of the bar or mandrel is a pipe expanding ball 42 which as shown is hollow and has oppositely tapering ends 42$^a$ with a connecting integrally formed cylindrical portion 42$^b$ that engages the inner surface of the pipe and expands the end of the pipe A to or slightly above the desired external diameter.

In order to support the front or ball end of the bar, the mandrel 58 and post 57 are located so that the ball 42 will rest on the trough 55 in position to operatively engage with the advancing end of a pipe in the trough 55.

In carrying out my improved method with the apparatus of Figs. 1, 2, and 6, the heated pipe skelp is discharged through one or the other of the openings 3, 4, in the end wall of the furnace 2 into the bite of one of the two pairs of welding rolls 5 and 6 and on to the trough 9 or 10. The mandrel or bar by which the welding ball is held in position between the welding rolls during the welding operation is then withdrawn from the welded pipe in the usual manner, and the pipe is rolled transversely of its length on the skids 14 until it rests in the trough 36. Fluid pressure is then admitted to the depending cylinder 63 to move the gripper or stop 61 into holding engagement with the pipe positioned in the trough 36 so as to prevent endwise movement of the pipe in the trough, and after the pipe is gripped fluid pressure is admitted simultaneously to the rear ends of the cylinders 37 and 38 which causes the pistons 39 to be moved forwardly. As the pistons move forwardly the pipe expanding balls 42 and 43 on the ends of the piston rods 40 and 41 are caused to approach each other and are forced into the ends of the pipe and the pipe is expanded to or slightly above the standard diameter of the pipe for some distance inwardly from each end, and any flat spots or irregularities in the ends of the pipe are removed, the ends of the pipe being made truly cylindrical by the expanding operation. Fluid pressure is then admitted to the stuffing box ends of the cylinders 37 and 38 and the expanding balls 42 and 43 are withdrawn from the pipe. The piston in the cylinder 63 is then moved to lift the gripper 61 and release the pipe. The expanded pipe is then rolled on the skids 15 into the trough 13 and the feed rolls 16 in this trough move the pipe forwardly into the bite of the sizing rolls 19. The sizing rolls reduce the pipe to the same diameter throughout its length and the pipe is discharged from the sizing rolls into the trough 23 and is delivered by the feed rolls 24 in the bottom of this trough to the cross rolls 46. The pipes are straightened in passing through the cross rolls 46, the pipe traveling lengthwise between the cross rolls while being straightened. The pipes are delivered from the straightening rolls to the trough 47 at the discharge end of these rolls and the feed rolls in this trough deliver the pipe lengthwise until its forward end contacts with the stop at the end of the trough 47. The pipes are then rolled from the trough 47 on the skids 48 to the cooling bed 49 on which they are cooled and stored until required for further use.

With the apparatus shown in Figs. 3 and 4 which is adapted for use in expanding one end of the pipe, the method of handling the pipes in expanding the pipe ends is somewhat different from that shown in Figs. 1 and 2. In carrying out my method with the apparatus shown in these figures, the pipe is welded in the usual manner and, while still heated from the welding operation, is delivered upon the trough 52 into the sizing rolls 54. The pipe is sized in these rolls and is delivered thereby to the trough 55 on one side of the sizing rolls, and as the pipe is positively fed forwardly in the trough 55 by the sizing rolls 54 its front end engages with the pipe expanding ball 42 on the end 42$^b$ of the mandrel or bar 58. Upon entering the pipe, first the conical end portion 42$^a$ and then the cylindrical portion of the ball 42 engages the inner surface of the pipe and the pipe moves the mandrel 58 and pipe ball 42 lengthwise toward the post 57 until the collar 60 on the mandrel engages with the post. The further lengthwise movement of the pipe by the sizing rolls 54 then forces the end of the pipe over the expanding ball 42 and enlarges the diameter of the end of the pipe to, or slightly above that desired. The direction of rotation of the rollers in the trough 55 is then reversed and the pipe is moved backwardly until its end is again engaged by the sizing rolls 54. The direction of rotation of the sizing rolls also having been reversed, the pipe A is caused to pass in the reverse direction through the sizing rolls 54 and the expanded end of the pipe is reduced to standard size or diameter if slightly larger than the standard diameter, as is sometimes the case, owing to variations in the gage or thickness of the wall of the pipe. When the rollers 56 in the trough 55 and sizing rolls 54 move the pipe backwardly, the frictional engagement of the expanded pipe end with the expanding ball 42 will cause the ball 42 and mandrel 58 to move backwardly with the pipe until the collar 59 on the end of the mandrel engages with the supporting post of this end of the mandrel. When the mandrel reaches this position, the end of the pipe will be in engagement with the sizing rolls 54 and as these rolls tightly grip the pipe, the pipe will be pulled off the expanding ball 42 and the expanding ball will be left in position to be engaged by the next pipe to be expanded. When the pipe is entirely off the expanding ball the expanding ball 42 will rest on the end of the trough 55 and in this way will be maintained in position to enter the advancing end of the next pipe operated upon.

The advantages of my invention will be appreciated by those skilled in the art. By the use of my invention the ends of the pipes are expanded and rounded while still heated from the welding operation to or slightly above the standard diameter of the size of pipe being operated upon, and irregularities in contour of the front end of the pipe are removed and the pipe made truly cylindrical and of uniform size.

By making both ends of the pipe to exactly the standard diameter, the number of defective pipes caused by variations in diameter of the front and rear ends of the pipe is very largely reduced and the scrap loss is thereby lessened. The provision of pipes of equal and sufficiently large diameter at their ends lessens the number of pipes having defective threads.

It is to be understood that the terms, pipe and pipes, as used herein, are to include what are termed tubes.

Modifications in the construction and arrangement of the apparatus may be made without departing from my invention within the scope of the appended claims.

I claim:

1. The method of finishing welded pipes and tubes which consists in welding the pipe or tube, expanding the small end of the welded pipe or tube and then subjecting the expanded pipe or tube to the action of sizing rolls, to thereby standardize the diameter of the ends thereof.

2. The method of finishing welded pipes and tubes which consists in welding the pipe or tube, then expanding at least one end of the welded pipe or tube, and then subjecting the expanded pipe or tube to the action of sizing rolls while still heated from the welding operation to thereby standardize the diameter of the ends thereof.

3. The method of finishing welded pipes and tubes which consists in welding the pipe or tube, then expanding the ends of the welded pipe or tube, and then subjecting the expanded pipe or tube to the action of sizing rolls while still heated from the welding operation to thereby standardize the diameter of the ends thereof.

4. Apparatus for making welded pipes and tubes comprising, in combination, welding rolls, sizing rolls on the discharge side of the welding rolls, and means for expanding the small end of the welded pipes or tubes after the welding operation and prior to passing the tubes through said sizing rolls in finally sizing the pipes, said means including an expanding ball and means for causing the ball to enter said end of the pipes or tubes.

5. Apparatus for making welded pipes and tubes comprising, in combination, welding rolls, sizing rolls on the discharge side of the welding rolls, an expanding ball positioned between the welding rolls and sizing rolls and means for supporting said expanding ball, said means being arranged to hold the ball in position to enter an end of the pipes or tubes.

6. In apparatus for making welded pipes or tubes, the combination of welding rolls, an expanding ball for expanding an end of said pipes or tubes, and means for actuating said expanding ball in expanding the pipes or tubes.

7. In apparatus for making welded pipes or tubes, the combination of welding rolls, an expanding ball for expanding at least one end of said pipes or tubes, means for actuating said expanding ball in expanding the pipes or tubes, and means for transferring the welded pipes or tubes from the welding rolls into position to be engaged by said expanding ball.

8. In apparatus for making welded pipes or tubes, the combination of welding rolls, expanding balls for enlarging the ends of said pipes or tubes, means for holding the pipes in position when enlarging the ends thereof, means for causing a relative approach of said expanding balls in enlarging the ends thereof to standard diameter to thereby equalize the diameter of the ends of said pipe.

9. Apparatus for making welded pipes and tubes, comprising in combination, sizing rolls and means for expanding the small end of the welded pipes or tubes after the welding operation and prior to passing the tubes through said sizing rolls in finally sizing the pipes, said means including an expanding ball and means for causing the expanding ball to enter said end of the pipes or tubes.

10. In apparatus for making welded pipes or tubes the combination of sizing rolls, an expanding ball for expanding an end of the pipe or tube, and means for causing relative movement of said expanding ball and a pipe or tube to bring the expanding ball into expanding engagement with the pipe or tube, preparatory to finally sizing the pipe.

In testimony whereof, I have hereunto set my hand.

JOSEPH W. LATSHAW.

Witnesses:
F. E. BROWN,
E. O. ROEMHILD.